Patented Apr. 29, 1952

2,595,068

UNITED STATES PATENT OFFICE 2,595,068

PRODUCTION OF PENICILLIN SALTS

Erling Frederiksen, Holte, and Erling Juhl Nielsen, Charlottenlund, Denmark, assignors, by mesne assignments, to American Cyanamide Company, New York, N. Y., a firm No Drawing. Application July 1, 1948, Serial No. 36,429. In Denmark December 10, 1947

3 Claims. (Cl. 260—239.1)

It is known that penicillin is most readily obtained in the pure state in form of its potassium or ammonium salt, which crystallize well. On the other hand, however, the said salts are not well suited for therapeutic employment, whereas the sodium and calcium salts are well suited for this purpose. In order to obtain the latter salts the free penicillin may be liberated by adding an acid to a solution of the potassium or ammonium salt in water at the same time transferring the penicillin into a suitable organic solvent after which the penicillin is reextracted with a solution of sodium or calcium hydroxide in water. The yield in this process is, however, relatively bad.

Generally the present invention has for its object the production of the sodium or calcium salt of penicillin by a process in which a better yield can be obtained. For this purpose a solution of a salt of penicillin which may be a salt of the readily crystallizable kind mentioned above is first produced. Such solution may well be a solution of the potassium salt. The cation of this salt must be one which is not in itself detrimental to penicillin, and which forms insoluble compounds not detrimental to the penicillin. To this solution is added a sodium or calcium salt capable of precipitating the cation in question by the reaction generally termed double decomposition.

With these general statements of the objects and purposes of our invention we will now proceed to describe the embodiment thereof and the manner in which our invention is carried out, and it will be understood that while we have described what may be considered as a preferable embodiment of our invention, we do not limit ourselves to the precise conditions or proportions herein set forth, as they may be varied by those skilled in the art in accordance with the particular purposes for which they are intended, and the conditions under which they are to be utilized.

According to the invention a solution of the potassium salt of the penicillin is first produced in any well known manner and this solution is reacted with a sodium or calcium salt, soluble in the solvent in question, of an acid, which forms with potassium a salt which is sparely soluble in the solvent employed, after which the potassium salt thereby precipitated is removed. The sodium or calcium salt may thereby be obtained in a much better yield than in the known process.

In some cases it is desired to obtain the sodium or calcium salt of penicillin in aqueous solution and for this purpose, according to the invention, an aqueous solution of the potassium salt of penicillim is mixed with an aqueous solution of a sodium or calcium salt of an acid capable of forming a potassium salt that is sparely soluble in water. If the sodium or calcium salt is added in proportions exactly equivalent to this proportion of the potassium salt of penicillin present and if by choosing a suitable temperature the precipitation of the potassium salt of the acid residue of the added salt is made as complete as possible, the solution will be obtained in pure form and may be employed, if so desired, in the state in which it is obtained, f. inst. for peroral administration or in the sterilized state for parenteral administration, the sterilization being obtained f. inst. by a sterilizing filtration. The aqueous solution may, however, also be used as a starting material in processes of known kind in which the sodium or calcium salt can be recovered in a crystalline or solid state.

The reaction may, however, also be carried out in other solvents, of which methanol has been found particularly suitable and this solvent may be used in completely anhydrous state if so desired, whereby the separation of the sodium or calcium salt in the crystalline or solid state after the reaction with the salt added and removal of the potassium salt formed may be comparatively easily obtained.

Thus after the removal of the potassium salt a solvent in which the sodium or calcium salt is less soluble than in methanol and which is less volatile than methanol may be added after which the mixture is distilled in vacuo until the methanol has been removed or the solvent added has obtained such a concentration that the sodium or calcium salt will crystallize or separate in solid state on cooling and standing.

Another way of proceeding is that, after the removal of the potassium salt and evaporation of the methanol solution to higher concentration if so desired, a solvent which can be mixed with methanol and in which the sodium or calcium salt is sparely soluble is added to form such a concentration that the sodium or calcium salt crystallizes or precipitates. In this case the solvent needs not to be less volatile than methanol.

By way of example of the solvents which can be used in connection with methanol are alcohols higher than methanol, f. inst. n-propanol, isopropanol or butanols or esters such as ethylacetate, butylacetate or amylacetate or ethers, f. inst. diethylether, di-isopropylether, di-isoamylether or dioxane. Among these solvents diethylether is so volatile and the sodium or calcium salt of penicillin is so sparely soluble therein that it is particularly suitable for use in the manner last stated.

By way of precipitating agents sodium or calcium perchlorate may be used according to the invention both when water and methanol are used for the reaction medium. It is surprising that said salts, which are known as strong oxidizing agents can be used as precipitating agents in a solution of substances so vulnerable as penicillin compounds.

In order to illustrate more closely the invention some embodiments are stated in the following by way of non-limitative examples:

Example 1

6.2 gs. of the potassium salt of penicillin are dissolved in 70 mls. of dry methanol and a solution of 2 gs. of sodium perchlorate in 10 mls. of methanol is added. After standing at 0° C. for one hour the potassium perchlorate separated from the solution is removed by filtration. The filtrate is mixed with 40 mls. of dry butanol and the mixture is distilled in vacuo. The temperature is maintained below 30° C. When the methanol has been evaporated the crystallization of the sodium salt of penicillin will take place.

Yield: 85-90 percent.

Example 2

12.4 gs. of the potassium salt of penicillin are dissolved in 140 mls. of dry methanol and the equivalent proportion of calcium perchlorate dissolved in 10 mls. of dry methanol is added. After standing at 0° C. the separated potassium perchlorate is removed by filtration. The filtrate is evaporated to one fourth of its volume and 4 volumes of diethylether are added. The calcium salt of penicillin will precipitate in solid state and may be washed by means of a little ethyl alcohol.

Yield: 85-90 percent.

We claim:

1. A method of preparing sodium penicillinate which comprises adding sodium perchlorate to a solution of potassium penicillinate in substantially anhydrous methanol, separating the soluble from the insoluble matter, reducing the volume of the solution and recovering by crystallization sodium penicillinate.

2. A method of preparing calcium penicillinate which comprises adding calcium perchlorate to a solution of potassium penicillinate in substantially anhydrous methanol, separating the soluble from the insoluble matter, reducing the volume of the solution and recovering by crystallization calcium penicillinate.

3. A method of preparing salts of penicillin which comprises adding a member of the group consisting of sodium perchlorate and calcium perchlorate to a solution of potassium penicillinate in substantially anhydrous methanol, separating the soluble from the insoluble matter, reducing the volume of the solution and recovering by crystallization a salt of penicillin of the group consisting of sodium penicillinate and calcium penicillinate.

ERLING FREDERIKSEN.
ERLING JUHL NIELSEN.

REFERENCES CITED

The following references are of record in the file of this patent:

UNITED STATES PATENTS

| Number | Name | Date |
|---|---|---|
| 2,487,668 | Pasternack et al. | Nov. 8, 1949 |
| 2,493,625 | Goldberg et al. | Jan. 3, 1950 |
| 2,496,848 | Bernhart | Feb. 7, 1950 |

OTHER REFERENCES

Abraham et al.: "The British of Ex'p't'l. Path.," vol. 23, June 1942, p. 113.